P. SAMAIN.
GEARING.
APPLICATION FILED JAN. 24, 1921.

1,390,971. Patented Sept. 13, 1921.

INVENTOR:
PIERRE SAMAIN
ATTORNEY.

UNITED STATES PATENT OFFICE.

PIERRE SAMAIN, OF CUSY, FRANCE.

GEARING.

1,390,971.  Specification of Letters Patent.  Patented Sept. 13, 1921.

Application filed January 24, 1921. Serial No. 439,651.

*To all whom it may concern:*

Be it known that I, PIERRE SAMAIN, a citizen of the French Republic, and resident of Cusy, Haute-Savoie, France, have invented certain new and useful Improvements in Gearing, (for which I have filed application in Belgium, January 20, 1920), of which the following is a specification.

The present invention has for its object to provide a novel change speed gear for progressive speed and reversing of motion, in which the usual toothed gear is dispensed with, so that no losses of power due to the friction between said toothed wheels, occur, the motion of the motor or driving shaft being transmitted to the driven shaft, by exerting a pressure causing a rolling motion without slipping between the elements in contact, as it will be exposed hereinafter.

The novel change speed gear may be applied to automobiles and to any engines or machines, machine tools of any type, thus dispensing with the various transmission parts such as belts, pulleys and the like connection devices.

The novel device essentially consists in the combination of two disks disposed opposite and in parallel relation with respect to each other and operated by a pinion keyed on a hollow driving shaft into which is slidingly engaged a solid shaft forming the sliding member, respectively the driven or transmission shaft of the change speed gear, this latter having fixed upon it an element such as a ball, a roller or disk of lenticular shape interposed between the said disks, which latter may be firmly pressed in opposite directions against said element by means of a resilient pressure device.

It may be understood that, when the driving shaft rotates, the toothed pinion keyed on it and engaging both disks, rotates the latter in directions opposite to each other, whereby the interposed element, firmly pressed by said disks, rotates, carrying with it the sliding member.

Now, when by means of any known shifting device the sliding member radially disposed with respect to the disks is shifted in the direction of a diameter of the disks, the element fixed to the sliding member also slides radially in said direction and to every position of the element corresponds a determinated speed of rotation of same and consequently of the sliding member of the change speed gear. When the said element is shifted at the center line of the disks, the two diametrically opposite points of contact of the element with the disks coincide with the centers of both disks respectively and the element stops, whereby the sliding member also stops. This position of the element corresponds to the "off position" of the change speed gear.

Now when the element is moved into the end positions of its trajectory corresponding to the periphery of the disks, the element and the sliding member rotate with a maximum of velocity, one of such positions corresponding to the forward motion, the other to the rearward motion of the device.

In order that the nature of the invention may be readily understood, the novel device is illustrated by way of example in the accompanying diagrammatic drawing, in which.

Figure 1:
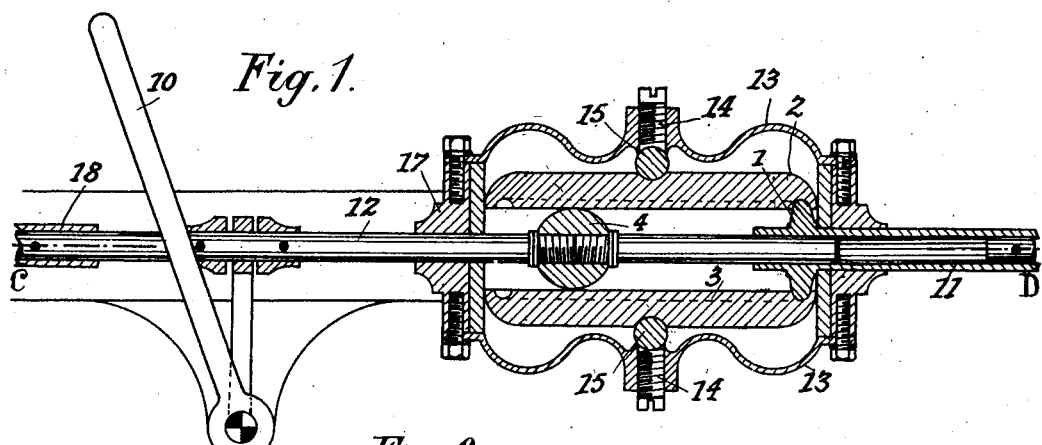
Figure 1 shows a constructive form in section according to line A—B of Fig. 2.
Figure 2:
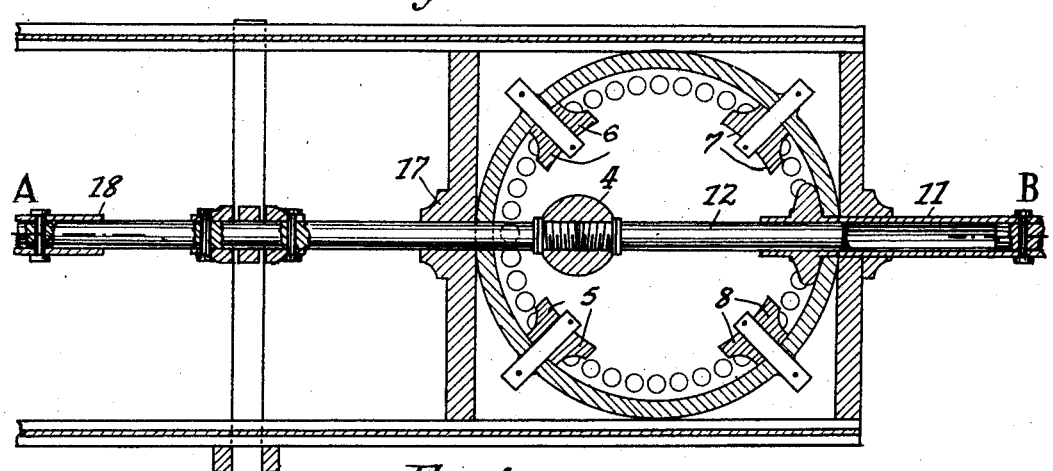
Fig. 2 is a section on line C—D of Fig. 1.

Referring to said drawing, 2 and 3 are two disks disposed opposite and in parallel relation to each other and provided at the periphery with holes for being engaged by pins of a common angle wheel 1 (Fig. 3) fixed at the end of the hollow driving shaft 11. Into the latter is slidably engaged a solid shaft 12 forming the sliding member or driven shaft of the change speed gear and upon shaft 12 is fixed in any convenient manner a ball 4 made of tempered steel. Shaft 12 is guided at one hand within shaft 11, on the other hand by a cross beam 17 through which it extends, said cross beam being secured on the frame. Shaft 12 may be operated by means of a lever 10, whereby it moves in a radial direction with respect to both disks 2 and 3. To every position of the ball 4 slidable between both disks corresponds a determinated speed of rotation of same and consequently of the sliding member 12.

When the latter is pushed toward the left by means of the lever 10, ball 4 and sliding member 12 rotate in the forward direction of the machine or the like, the maximum speed being obtained when the ball is in its outermost position toward the left.

When the shaft 12 is pushed back toward the right, beyond the centers of the disks, the machine or the like, the machine rotates in the rearward direction.

The whole device is inclosed in a casing formed of two undulated caps 13 made of pressed tempered steel and forming strong springs balancing each other.

By means of screws 14 the disks 2 and 3 may be firmly pressed against the ball 4 in order to secure a perfect rolling of the latter without any slipping, during the rotary motion. Balls 15 inserted between the screws 14 and the disks 2 and 3 form pivots for the latter.

Owing to the undulations of the caps 13 they act as strong springs upon the disks 2 and 3 through the intermediate balls 15.

Rollers 5 and 6 freely rotatable on spindles secured to the lateral wall of the casing, support a fraction of the pressure exerted on disks 2 and 3 by the resilient caps 13 of the casing during the rearward motion of the device, while rollers 7 and 8, similarly mounted on spindles fixed to the lateral wall of the casing, support a fraction of the pressure on the disks during the forward motion of the device.

On the sliding member 12 is keyed a hollow shaft 18 controlling the differential of the wheels or the like.

Figures 3, 4:
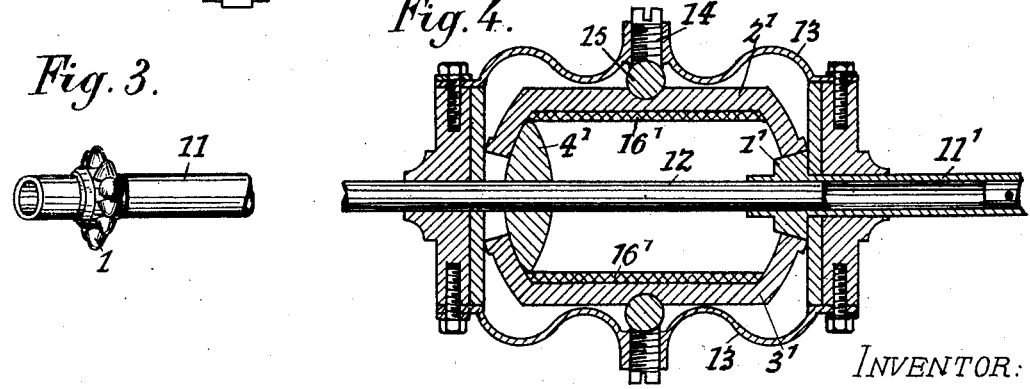
Fig. 3 shows the pinion secured onto the end of the driving shaft.
Fig. 4 is a different constructive form of the change speed gear.

Fig. 4 illustrates a constructive form of the change speed gear showing that the rolling element $4^1$ may be of any convenient shape and diameter, provided that its circular periphery contacts only at one point with each of the disks $2^1$, $3^1$. The rolling element in the example shown is of lenticular shape. It may be observed that the speed also varies with the diameter of the rolling element $4^1$; the smaller is the diameter of the element, the higher is the speed.

The variations of speed may also be obtained by varying the diameter of the pinion $1^1$ or that of the disks $2^1$ and $3^1$.

Between roller $4^1$ and disks $2^1$, $3^1$ may be inserted interchangeable disks $16^1$ made of any hard metal.

It is understood that the present invention is not limited to the constructive forms shown and described in the present specification.

Having now fully described my said invention, what I claim and desire to secure by Letters Patent, is:

1. Gearing of the type described, comprising a supporting element, a pair of undulated resilient caps mounted on said supporting element, a pair of oppositively disposed disks having a central universal bearing against said caps, a hollow drive shaft extending through the supporting element and between the disks and provided with an annular member engaging the faces of the disks for imparting rotation thereto, a solid shaft extending between the disks having bearing in the end portion of the hollow drive shaft and the supporting element, an engaging member carried by the solid shaft and engaged by the disks, means for moving the solid shaft in an axial direction, and idler rollers adapted to be engaged by the disks carried by the supporting element.

2. Gearing of the type described, comprising a circular casing, two symmetrically disposed tempered steel disks loosely inserted within the casing, a hollow driving shaft radially extending into said casing between both said disks, a toothed pinion keyed at the end of said hollow shaft extending within the casing and engaging said disks for imparting to the same a rotary motion in opposite directions, a solid shaft radially extending within said casing and slidably engaged into said hollow shaft, a guide outside the casing for guiding said solid shaft forming the sliding member of the change speed gear, a tempered steel member rigidly secured to said solid shaft between both said disks, undulated resilient caps forming the top and bottom of said casing, set screws engaging threaded holes provided at the center of each of the said undulated plates, balls inserted in alveolæ provided in the center of the outer face of said disks and pressed by the said screws, whereby a strong pressure is exerted in opposite directions by the undulated spring plates upon the disks, these opposite pressures being transmitted by the disks upon the rolling member in order to prevent any slipping of the latter on the disks and pairs of rollers loosely mounted on spindles fixed on the lateral wall of the casing in order to support a fraction of the pressure exerted by the resilient plates upon the disks during the motion of the device.

3. Gearing of the type described, comprising a casing, two symmetrically disposed tempered steel disks loosely inserted within said casing, a hollow driving shaft radially extending into said casing between both said disks, a toothed pinion keyed at the end of said hollow shaft projecting into the casing and engaging said disks for imparting to the same rotary motions in opposite directions, a solid shaft radially extending into said casing and slidably engaged into said hollow shaft, a guiding member for guiding the said solid shaft, an element secured to said solid shaft and operating between and driven by said disks, undulated resilient caps forming the top and bottom of said casing, a threaded central hollow on each of said caps, set screws engaged in said threaded central holes of the caps, an alveola at the center of the outer surface of each of said disks, a ball inserted in each of said alveolæ and receiving the pressure of the corresponding set screw for the purpose described.

4. Gearing of the type described, comprising a supporting element, a pair of undulated resilient caps oppositely disposed thereon, a pair of disks oppositely disposed between the caps, a universal bearing for each disk adjustably mounted in the caps, a hollow drive shaft rotatable in the supporting element and extending between the disks, a driving element carried by the shafts for driving the disks, a solid shaft slidable in the hollow drive shaft and the supporting element, a member carried thereby frictionally engaging the disks, and means for sliding the solid shaft.

In testimony whereof I have hereunto set my hand in presence of two witnesses.

PIERRE SAMAIN.

Witnesses:
  JULIAN KEMBLE SMEDBERG,
  C. CARRIGAN.